United States Patent [19]
Stokes et al.

[11] Patent Number: 5,379,743
[45] Date of Patent: Jan. 10, 1995

[54] SPARK IGNITED INTERNAL COMBUSTION ENGINES

[75] Inventors: John Stokes; Timothy H. Lake, both of West Sussex, England

[73] Assignee: Ricardo Consulting Engineers Limited, West Sussex, England

[21] Appl. No.: 141,856

[22] Filed: Oct. 22, 1993

[30] Foreign Application Priority Data

Oct. 23, 1992 [GB] United Kingdom ............... 9222353

[51] Int. Cl.⁶ ................................................ F02B 47/08
[52] U.S. Cl. .................................. 123/568; 123/316
[58] Field of Search .............. 123/568, 571, 316, 569

[56] References Cited

U.S. PATENT DOCUMENTS

| | | | |
|---|---|---|---|
| 4,193,382 | 3/1980 | Oshima | 123/275 |
| 4,232,641 | 11/1980 | Curtil | 123/316 |
| 4,393,853 | 7/1983 | Groves | 123/308 |
| 4,475,524 | 10/1984 | Eckert et al. | 123/568 |
| 4,700,684 | 10/1987 | Pischinger et al. | 123/568 |
| 4,722,315 | 2/1988 | Pickel | 123/90.11 |
| 4,829,958 | 5/1989 | Dwet | 123/316 |
| 4,856,473 | 8/1989 | Kawai et al. | 123/308 |
| 4,905,646 | 3/1990 | Tanahashi | 123/295 |
| 4,924,840 | 5/1990 | Wade | 123/568 |
| 4,991,547 | 2/1991 | Davis et al. | 123/568 |
| 5,009,199 | 4/1991 | MacFarlane | 123/316 |
| 5,115,790 | 5/1992 | Kawamura | 123/568 |
| 5,203,310 | 4/1993 | Gatellier | 123/568 |

FOREIGN PATENT DOCUMENTS

| | | | |
|---|---|---|---|
| 3828742 | 3/1989 | Germany . | |
| 63-173840 | 7/1988 | Japan | 123/568 |
| 2052634 | 1/1981 | United Kingdom | 123/52 M |
| 2134596 | 8/1984 | United Kingdom . | |

Primary Examiner—David A. Okonsky
Attorney, Agent, or Firm—McAulay Fisher Nissen Goldberg & Kiel

[57] ABSTRACT

A spark ignited engine of the type employing exhaust gas recirculation and stratification of the recirculated exhaust gas. The engine has at least one cylinder accommodating a piston and communicating with at least one inlet port cooperating with an inlet valve for inducing air into the cylinder, and at least one exhaust port cooperating with an exhaust valve for discharging exhaust gas from the cylinder. The engine is operated such that the recirculated exhaust gas is induced alone into the cylinder through the inlet port during a part of the engine operating time whereby recirculated exhaust gas and air are introduced through the same port, though at different times.

12 Claims, 4 Drawing Sheets

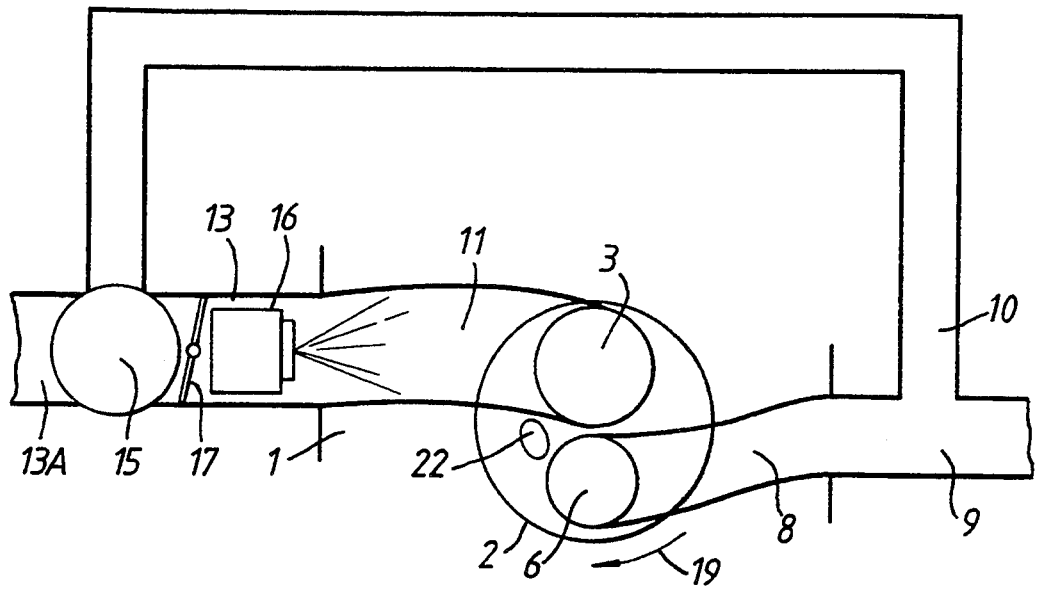
Fig.5
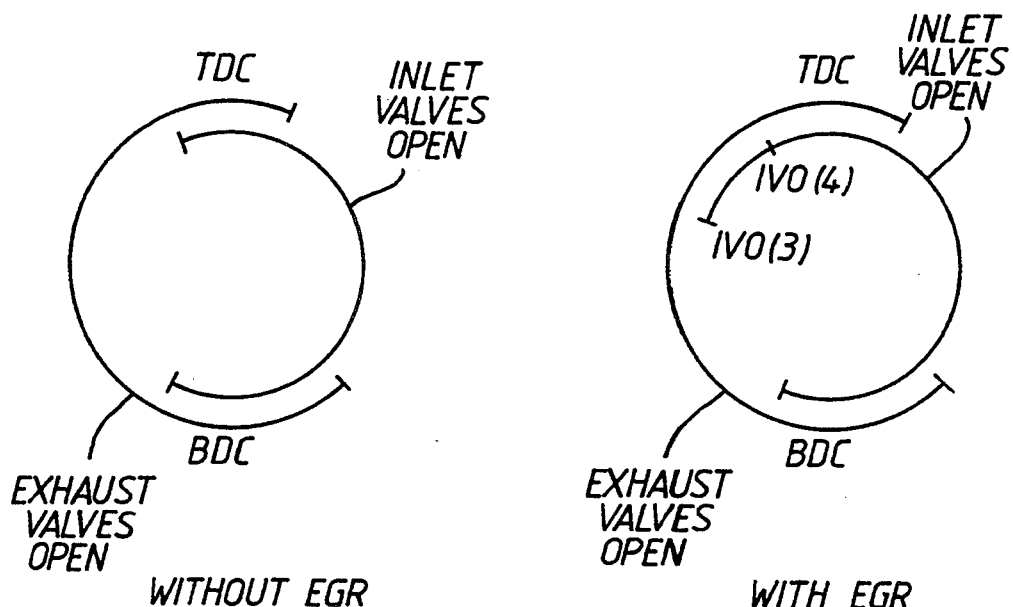
Fig.8a WITHOUT EGR
Fig.8b WITH EGR

SPARK IGNITED INTERNAL COMBUSTION ENGINES

BACKGROUND OF THE INVENTION

I. Field of the Invention

The present invention relates to internal combustion engines of spark ignited type and is concerned with reducing the emission by such engines of oxides of nitrogen (NOx) and hydrocarbons (HC) and reducing the fuel consumption.

II. Description of the Prior Art

A known method for reducing NOx emissions and fuel consumption of a gasoline engine is to ensure that a lean fuel/air mixture is employed. This has the effect of diluting the fuel with air and reducing the combustion temperature. Lower combustion temperatures tend to result in reduced NOx emissions. Reduced trottling losses and better combustion efficiency of the so-called lean burn engine result in lower fuel consumption. A major disadvantage of this approach is that excess oxygen is present in the exhaust gas. It is therefore not possible to employ a reducing catalyst if further reductions in NOx emissions are required.

It is also known that a similar effect to that achieved with lean burn can be achieved by the use of exhaust gas recirculation (EGR). If, instead of diluting the combustion gases with excess air, they are diluted with recirculated exhaust gas (REG), reductions in temperature can be achieved without the use of excess oxygen. The combustion process can be substantially stoichiometric and it is possible to use a reducing catalyst in the exhaust system for the conversion of residual NOx. A further benefit of using EGR is a fuel economy improvement due to the reduced throttling losses in the intake air stream. However, the use of EGR is also associated with disadvantages if the exhaust gas is distributed throughout the combustion chamber because it adversely affects the initiation and propagation of the flame front and can result in premature termination of combustion and is thus responsible for an increase in the emission of unburnt hydrocarbons.

It is also known that the problems associated with the use of EGR can be largely overcome by configuring the engine such that a stratified charge is produced in the combustion chamber, that is to say by arranging the air and recirculated exhaust gas inlets such that the air/fuel mixture and recirculated exhaust gas occupy separate portions of the combustion chamber and remain substantially unmixed. Additionally, stratification of the exhaust gas over crevices, oil and deposits in the combustion chamber will reduce HC emissions by preventing contact of the air/fuel mixture with the oil, crevices and deposits. The known methods of achieving this involve additional inlet ports or valves which are used solely for the induction of recirculated exhaust gas or allow air and exhaust gas to mix before or while passing through the inlet valve. Engines of both these types are disclosed in U.S. Pat. No. 4,193,382.

The disadvantage of such systems is that the additional opening into the combustion chamber adds cost and complexity and limits the space available for the other features of the combustion chamber such as intake and exhaust valves and the spark plug. The introduction of exhaust gas into the air stream before the inlet valve leads to substantial mixing and thus ineffective stratification and thus results in the disadvantages referred to above.

U.S. Pat. No. 4,393,853 discloses a four cylinder engine in which each cylinder has a single inlet port and a single exhaust port formed in the cylinder head and a further tangentially directed exhaust outlet/EGR inlet formed in the cylinder wall and positioned to be exposed by the piston at 60° after the top dead center position. The exhaust outlet/EGR inlets of the four cylinders are connected together in two pairs. The inlet port is of helical type whereby on the induction stroke the inlet air is introduced into the cylinder to form a body of air which swirls around the cylinder axis. At low load, when the exhaust outlet/EGR inlet is exposed by the piston recirculated exhaust gas is introduced tangentially into the cylinder from the cylinder to which it is connected so that it swirls in the same direction as the air. The exhaust gas remains substantially outside the air and the contents of the cylinder are therefore nominally radially stratified. On the exhaust stroke the exhaust gases are all expelled in the usual manner through the exhaust valve in the cylinder head except for that small proportion which is required by the associated cylinder and this is discharged through the exhaust outlet/EGR inlet opening.

Quite apart from the fact that it has been found that radial stratification is unsatisfactory due to the fact that the two rotating bodies of gas tend to become considerably mixed, it is inconvenient to have to position an opening in the cylinder wall. Thus the presence of such an opening leads to high wear of the piston rings and to distortion of the cylinder wall which results in high oil consumption. Furthermore, the piston tends to scrape lubricating oil into the opening and the exhaust gas thus contains a relatively high proportion of unburnt or partially burnt oil.

In modern engines with four valves per cylinder it is common practice to induce air into the cylinder such that a tumbling motion occurs, that is to say rotation about an axis which is at right angles to the cylinder axis.

A known method of providing a stratified charge with a tumble inducing combustion chamber is described in a paper issued by the Society of Automotive Engineers, namely SAE 920670. This discloses a combustion chamber with two intake valves which have ports designed to provide tumbling air motion. A fuel injector is positioned such that a fuel and air mixture is induced through one of the intake valves but air alone is induced through the other intake valve. This produces horizontal stratification in the cylinder such that a rich fuel/air mixture exists on one side of the cylinder and a very weak mixture, or pure air, exists at the other side. The spark plug is positioned within the rich mixture zone so that the fuel can be easily ignited.

The disadvantage of this system is that which applies to other lean burn technologies. That is the presence of excess oxygen in the exhaust gas prevents the use of a reducing catalyst.

SUMMARY OF THE INVENTION

It is the object of the present invention to provide a spark ignited engine which is configured to produce a stratified charge in the or each combustion chamber and which uses exhaust gas recirculation, but which does not use additional ports or valves for the induction of the exhaust gas into the cylinder while also maintaining separation of the exhaust gas from the inlet air until the cylinder is reached, and even then, maintains them substantially separate, i.e. stratified.

SPARK IGNITED INTERNAL COMBUSTION ENGINES

BACKGROUND OF THE INVENTION

I. Field of the Invention

The present invention relates to internal combustion engines of spark ignited type and is concerned with reducing the emission by such engines of oxides of nitrogen (NOx) and hydrocarbons (HC) and reducing the fuel consumption.

II. Description of the Prior Art

A known method for reducing NOx emissions and fuel consumption of a gasoline engine is to ensure that a lean fuel/air mixture is employed. This has the effect of diluting the fuel with air and reducing the combustion temperature. Lower combustion temperatures tend to result in reduced NOx emissions. Reduced trottling losses and better combustion efficiency of the so-called lean burn engine result in lower fuel consumption. A major disadvantage of this approach is that excess oxygen is present in the exhaust gas. It is therefore not possible to employ a reducing catalyst if further reductions in NOx emissions are required.

It is also known that a similar effect to that achieved with lean burn can be achieved by the use of exhaust gas recirculation (EGR). If, instead of diluting the combustion gases with excess air, they are diluted with recirculated exhaust gas (REG), reductions in temperature can be achieved without the use of excess oxygen. The combustion process can be substantially stoichiometric and it is possible to use a reducing catalyst in the exhaust system for the conversion of residual NOx. A further benefit of using EGR is a fuel economy improvement due to the reduced throttling losses in the intake air stream. However, the use of EGR is also associated with disadvantages if the exhaust gas is distributed throughout the combustion chamber because it adversely affects the initiation and propagation of the flame front and can result in premature termination of combustion and is thus responsible for an increase in the emission of unburnt hydrocarbons.

It is also known that the problems associated with the use of EGR can be largely overcome by configuring the engine such that a stratified charge is produced in the combustion chamber, that is to say by arranging the air and recirculated exhaust gas inlets such that the air/fuel mixture and recirculated exhaust gas occupy separate portions of the combustion chamber and remain substantially unmixed. Additionally, stratification of the exhaust gas over crevices, oil and deposits in the combustion chamber will reduce HC emissions by preventing contact of the air/fuel mixture with the oil, crevices and deposits. The known methods of achieving this involve additional inlet ports or valves which are used solely for the induction of recirculated exhaust gas or allow air and exhaust gas to mix before or while passing through the inlet valve. Engines of both these types are disclosed in U.S. Pat. No. 4,193,382.

The disadvantage of such systems is that the additional opening into the combustion chamber adds cost and complexity and limits the space available for the other features of the combustion chamber such as intake and exhaust valves and the spark plug. The introduction of exhaust gas into the air stream before the inlet valve leads to substantial mixing and thus ineffective stratification and thus results in the disadvantages referred to above.

U.S. Pat. No. 4,393,853 discloses a four cylinder engine in which each cylinder has a single inlet port and a single exhaust port formed in the cylinder head and a further tangentially directed exhaust outlet/EGR inlet formed in the cylinder wall and positioned to be exposed by the piston at 60° after the top dead center position. The exhaust outlet/EGR inlets of the four cylinders are connected together in two pairs. The inlet port is of helical type whereby on the induction stroke the inlet air is introduced into the cylinder to form a body of air which swirls around the cylinder axis. At low load, when the exhaust outlet/EGR inlet is exposed by the piston recirculated exhaust gas is introduced tangentially into the cylinder from the cylinder to which it is connected so that it swirls in the same direction as the air. The exhaust gas remains substantially outside the air and the contents of the cylinder are therefore nominally radially stratified. On the exhaust stroke the exhaust gases are all expelled in the usual manner through the exhaust valve in the cylinder head except for that small proportion which is required by the associated cylinder and this is discharged through the exhaust outlet/EGR inlet opening.

Quite apart from the fact that it has been found that radial stratification is unsatisfactory due to the fact that the two rotating bodies of gas tend to become considerably mixed, it is inconvenient to have to position an opening in the cylinder wall. Thus the presence of such an opening leads to high wear of the piston rings and to distortion of the cylinder wall which results in high oil consumption. Furthermore, the piston tends to scrape lubricating oil into the opening and the exhaust gas thus contains a relatively high proportion of unburnt or partially burnt oil.

In modern engines with four valves per cylinder it is common practice to induce air into the cylinder such that a tumbling motion occurs, that is to say rotation about an axis which is at right angles to the cylinder axis.

A known method of providing a stratified charge with a tumble inducing combustion chamber is described in a paper issued by the Society of Automotive Engineers, namely SAE 920670. This discloses a combustion chamber with two intake valves which have ports designed to provide tumbling air motion. A fuel injector is positioned such that a fuel and air mixture is induced through one of the intake valves but air alone is induced through the other intake valve. This produces horizontal stratification in the cylinder such that a rich fuel/air mixture exists on one side of the cylinder and a very weak mixture, or pure air, exists at the other side. The spark plug is positioned within the rich mixture zone so that the fuel can be easily ignited.

The disadvantage of this system is that which applies to other lean burn technologies. That is the presence of excess oxygen in the exhaust gas prevents the use of a reducing catalyst.

SUMMARY OF THE INVENTION

It is the object of the present invention to provide a spark ignited engine which is configured to produce a stratified charge in the or each combustion chamber and which uses exhaust gas recirculation, but which does not use additional ports or valves for the induction of the exhaust gas into the cylinder while also maintaining separation of the exhaust gas from the inlet air until the cylinder is reached, and even then, maintains them substantially separate, i.e. stratified.

According to the present invention, a spark ignited engine employing exhaust gas recirculation and stratification of the recirculated exhaust gas and having at least one cylinder accommodating a piston and communicating with at least one inlet port cooperating with an inlet valve for inducing air into the cylinder and at least one exhaust port cooperating with an exhaust valve for discharging exhaust gas from the cylinder is characterized in that the recirculated exhaust gas is induced alone into the cylinder through the inlet port during a part of the engine operating time. The recirculated exhaust gas (REG) is thus induced into the or each cylinder through the inlet port or one of the inlet ports, though not at the same time as inlet air or air/fuel mixture. During other parts of the engine operating time, air or air/fuel mixture flows through the inlet port in the usual manner, that is to say not mixed with REG.

Thus, no separate admission port for REG is required. But due to the fact that air or air/fuel mixture and REG flow through the inlet port at different times, no substantial mixing of air and REG occurs whereby they are sharply stratified within the cylinder.

The engine in accordance with the invention may have only a single inlet port through which both the inlet air, or air/fuel mixture, and REG must flow, though at separate times in order to ensure that satisfactory stratification occurs within the cylinder. In one embodiment of the invention this is achieved by the provision of fuel supply means arranged to introduce fuel into the inlet port, an exhaust gas recirculation duct connecting the exhaust port to the inlet port and a diverter valve which is situated at the junction of the exhaust gas recirculation duct and the inlet port and is controlled, at least at low engine loads, to connect the inlet port to the exhaust gas recirculation duct during the initial portion of each induction stroke of the piston, and to the atmosphere during the subsequent portion of each induction stroke of the piston. Thus, under low load conditions, at the beginning of each induction stroke pure REG is introduced into the cylinder and the diverter valve is then moved to connect the inlet port to atmosphere whereafter air/fuel mixture is introduced into the cylinder. This results in vertical stratification of the charge within the cylinder, that is to say that portion of the interior of the cylinder which is closest to the piston is occupied by REG and the remainder is occupied by the air/fuel mixture. The precise time at which the diverter valve is moved is controlled by the engine control system in dependence on the engine load so that the lower the engine load the later is the diverter valve moved, that is to say the more REG is introduced. If, as is preferred, the fuel supply means comprises a fuel injector then fuel injection is of course timed to occur during that part of the induction stroke in which air is induced into the cylinder. At high engine loads, the diverter or timing valve may be maintained stationary permanently connecting the inlet duct to the atmosphere, whereby no EGR is admitted into the cylinder.

In a modified embodiment with only a single inlet duct, no EGR duct is provided and one or both of the inlet valves is operated by a variable valve timing (VVT) mechanism of variable period and phase type. Such VVT mechanisms are known per se and are disclosed in, for instance, European Patent Application 0472430 and permit the opening and closing times of two or more valves to be varied independently. The VVT mechanism is controlled, at least at low engine loads, to open the inlet valve before the end of each exhaust stroke of the piston whereby exhaust gas flows into the inlet port and then flows back into the cylinder at the beginning of each induction stroke of the piston. Once the REG has flowed into the cylinder, air/fuel mixture flows after it whereby vertical stratification again occurs.

Both the embodiments described above may be modified by the addition of a second inlet port cooperating with an associated inlet valve and controlled to admit air into the cylinder at high engine loads but to admit no air at low engine loads. The control of the second inlet port may be effected by providing valve means in the second inlet port which is opened and closed as desired or by providing the associated valve with disabling means, which are known per se, which ensure that the valve is inoperative at low loads and remains closed but opens and closes in the conventional manner at high loads. The provision of this additional inlet port permits a greater volume of air to be supplied to the cylinder at those times when it is needed, that is to say at high engine loads.

In a particularly preferred embodiment, the engine is of the type including two inlet ports cooperating with respective inlet valves and preferably also two exhaust ports cooperating with respective exhaust valves. Such an engine will include valve means controlling the second inlet port, fuel supply means arranged to introduce fuel into the second inlet port, an exhaust gas recirculation duct connecting the exhaust port or one of the exhaust ports to the first inlet port and a diverter valve which is situated at the junction of the exhaust gas recirculation duct and the first inlet port. The diverter valve is controlled, at least at low engine loads, to connect the inlet port to the exhaust gas recirculation duct and, at high engine loads, to connect the first inlet port to the atmosphere. The valve means is controlled to permit a progressively increasing volume of air to flow through the second inlet port as the engine speed increases. The inlet ports are of tumbling type whereby the gas flowing in through them swirls within a respective portion of the cylinder about an axis substantially perpendicular to the cylinder axis. In this embodiment, the gases introduced into the cylinder through the inlet ports are horizontally stratified, that is to say they are separated from one another in the direction perpendicular and not parallel to the direction of the cylinder axis. It will be appreciated that the connection of the EGR duct to the exhaust port may be direct or indirect, e.g. the duct may be connected to the exhaust manifold some way downstream of the exhaust port.

In operation, REG is induced into the cylinder under part load conditions through the first inlet port. Under these conditions, all of the combustion fuel/air mixture enters the cylinder through the second inlet port. As the engine load increases, a point is reached at which more air is required for combustion than can be provided through one inlet port. At that point, the diverter valve is moved to connect the first inlet port to the atmosphere rather than the EGR duct whereby the supply of REG is shut off and air is induced through the first inlet port. As the engine load increases below the switching point, the mass flow rate of the REG may be reduced at a controlled rate by means of a throttle valve provided in the first inlet port, and at loads above the switching point, the mass flow rate of the air may be increased by means of the throttle valve. Under some circumstances, it may be desirable to provide a mixture of REG and air through the first inlet port in the region of the switching point. The necessary switching and control will of course be effected by a control system, e.g. the engine management system, which is typically microprocessor-based.

It is, of course, necessary that the engine includes a spark plug which is positioned to be surrounded by the fuel/air mixture. Thus, in order to ignite the fuel/air mixture at loads below the switching point, a spark plug is preferably positioned to that side of the cylinder which contains the fuel/air mixture. Since a more central position is preferable for full load operation, i.e. when no REG is present within the cylinder, two spark plugs may be provided with one close to the center of the cylinder which operates only under high load conditions. The spark plug situated towards the side of the cylinder preferably operates only under load conditions below the switching point.

This admission of REG is controlled principally in dependence on the engine load, which is closely related to the amount of fuel which is injected into the cylinder during each cycle. In practice, it is desirable also to modify the control parameter as a function also of the engine speed though the speed dependency is of reduced importance compared to the load dependency.

In each of the constructions referred to above, it is intended that recirculated exhaust gas should be introduced into the cylinder only at relatively low engine loads and that this should be replaced by air at higher engine loads. However, it is also contemplated that an amount of exhaust gas may be introduced at all engine speeds so as to obtain the known advantages. This may be simply achieved by programming the associated electronic control system appropriately.

BRIEF DESCRIPTION OF THE DRAWINGS

Further details of the invention will become apparent from the following description of certain specific embodiments of a stratified charge EGR engine in accordance with the invention which is given with reference to the accompanying diagrammatic drawings, in which:

FIG. 5 is a plan view of a third embodiment of the invention;

FIGS. 8A and 8B are diagrams showing the valve opening and closing times in the fourth embodiment of the invention with and without EGR, i.e. under low and high load conditions, respectively.

DESCRIPTION OF THE PREFERRED EMBODIMENTS

In each case, only a single cylinder is shown and described but it will be appreciated that, while the engine may have only a single cylinder, the cylinder will in practice be one of a number, e.g. four or more, similar cylinders.

Figure 1:
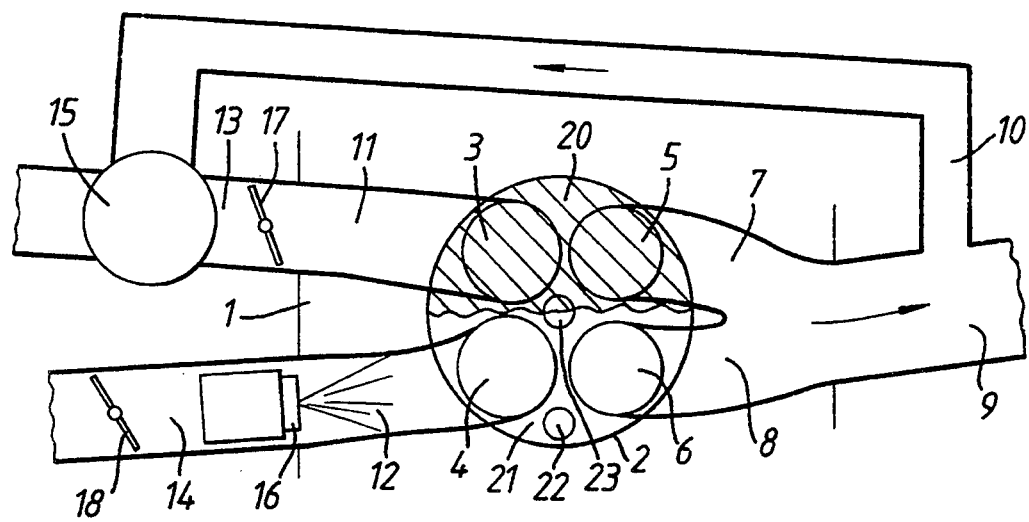
FIG. 1 is a plan view, with part in section, of a four-valve combustion chamber and associated ducting.
Figure 2:
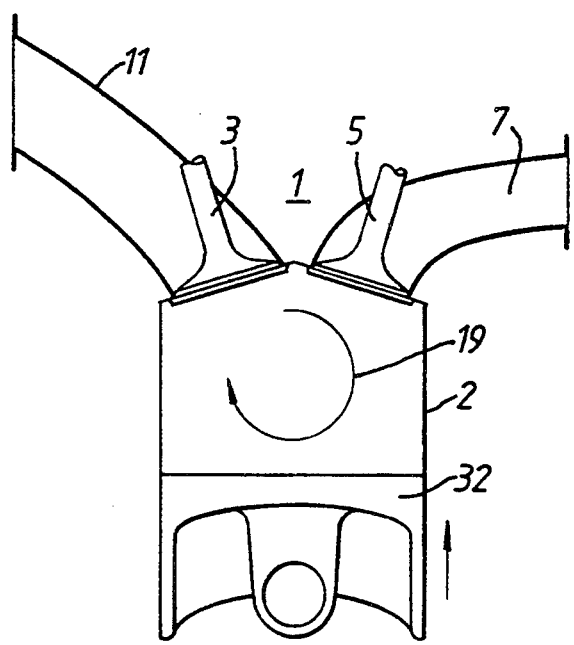
FIG. 2 is a side view of the same combustion chamber.

FIGS. 1 and 2 show a single cylinder of an engine of spark ignition type, in which a cylinder 2 accommodates a reciprocable piston 32. Cylinder 2 is closed by a cylinder head 1 which includes two inlet valves 3 and 4 controlling inlet ports 11 and 12, respectively, and two exhaust valves 5 and 6 controlling exhaust ports 7 and 8, respectively. Exhaust ports 7 and 8 communicate with exhaust duct 9 and EGR duct 10. Inlet ports 11 and 12 are generally parallel and communicate with generally parallel inlet ducts 13 and 14. EGR duct 10 communicates with inlet duct 13 via diverter valve 15. Inlet duct 14 supplies air to port 12 and valve 4 and contains fuel injector 16. Inlet ducts 13 and 14 are fitted with throttle valves 17 and 18, respectively. The various components of the engine including the fuel injector, throttle valve and diverter valve are controlled by an electronic control system (not shown).

The inlet ports are of directed type, that is to say the air flow through them tends to flow predominantly in one radial direction with respect to the axial direction of the associated valve. Due to the position and orientation of the inlet ports and valves, the inlet ports are also of tumbling type, that is to say the gas flowing through them tends to rotate or tumble within the cylinder about an axis perpendicular to the cylinder axis.

In use, the type of flow through the ports is dependent upon engine load. Under light load conditions, valve 15 allows flow only from EGR duct 10 into duct 13. Throttle valve 18 allows flow of air into port 12. The REG and air flow into cylinder 2 with a tumbling motion indicated by arrow 19. A stratification of the charge is produced in the cylinder such that region 20 (indicated by cross hatching) contains substantially pure REG and the remainder of the cylinder, region 21, contains substantially stoichiometric fuel and air mixture. The mixture is ignited by either spark plug 22 or 23 or both depending upon the combustion characteristic required. Under higher load conditions, valve 15 is moved to allow only air to flow through inlet port 11. At all loads, REG alone or air alone flows through inlet port 11 and thus under light load conditions a relatively sharp charge stratification is produced in the cylinder.

Figure 3:
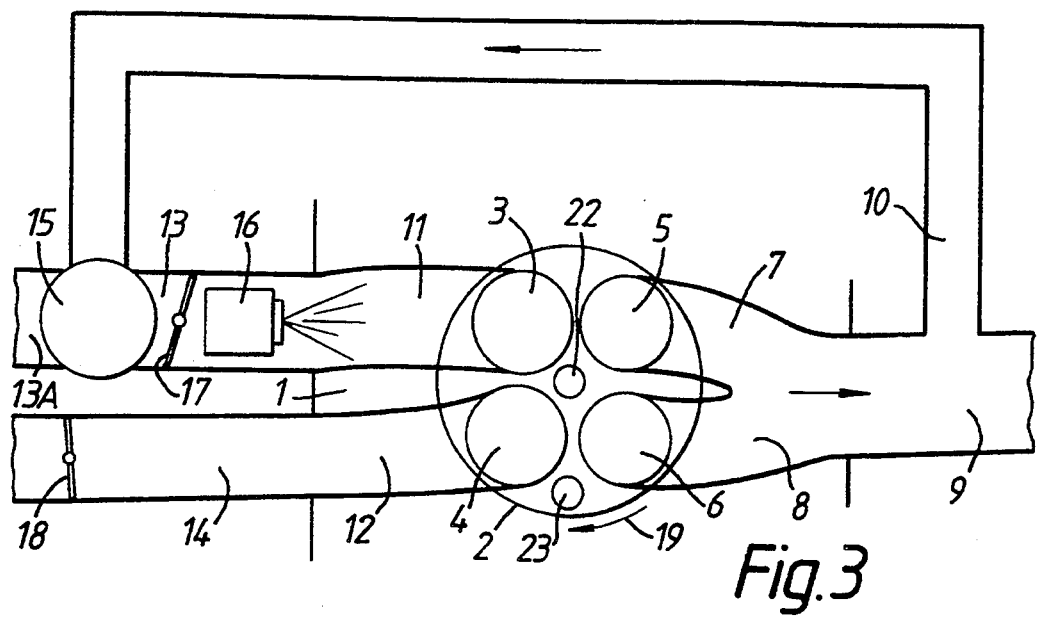
FIG. 3 is a plan view of a second embodiment of the engine.
Figure 4:
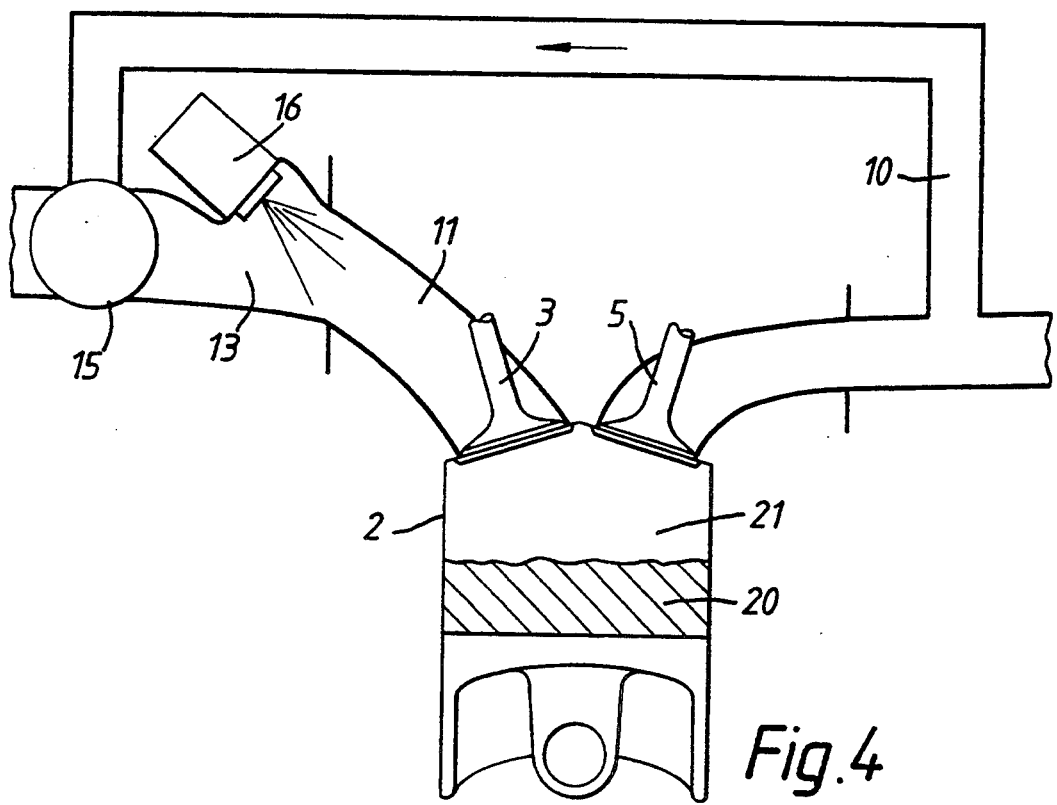
FIG. 4 is a side view, with part in section, of the second embodiment of the invention.

FIGS. 3 and 4 show a single cylinder of a further generally similar engine but in this case the inlet ports are directed generally tangentially and thus produce swirling motion of the inlet gases about the cylinder axis rather than a tumbling motion, as in FIGS. 1 and 2. Also the fuel injector 16 is situated in inlet duct 13, that is to say the duct through which the REG is supplied.

In use, the type of flow through the ports is dependent on engine load and piston position. Under light load conditions, valve 18 is closed and valve 15 initially allows flow from EGR duct 10 into duct 13 during the early part of each inlet stroke of the engine. As the piston descends the valve 15 is timed to connect duct 13 to air duct 13A. The REG and air flow into cylinder 2 substantially with a swirling motion indicated by arrow 19. A vertical stratification of the charge is produced in the cylinder such that region 20 (indicated by cross hatching) immediately above the piston contains substantially pure REG and the remainder of the cylinder, region 21, contains a substantially stoichiometric fuel and air mixture. The mixture is ignited by spark plug 22 or 23 or both depending on the combustion characteristics required. Under increasing load, the amount of REG introduced into the cylinder is progressively reduced. After a predetermined engine load is exceeded the induction of REG is terminated, i.e. valve 15 permanently connects inlet duct 13 to air duct 13A and valve 18 is progressively opened to admit air into the cylinder in an amount which increases as the engine load increases further.

FIG. 5 shows a single cylinder of an engine generally similar to that of FIGS. 3 and 4, but in this case, only a single inlet port and a single exhaust port are provided. The flow of gases through the inlet port is generally similar to that described in connection with FIGS. 3 and 4, but at higher loads, there is of course no additional air flow through a second inlet duct. The air/fuel mixture is ignited by the single spark plug 22.

Figure 6:
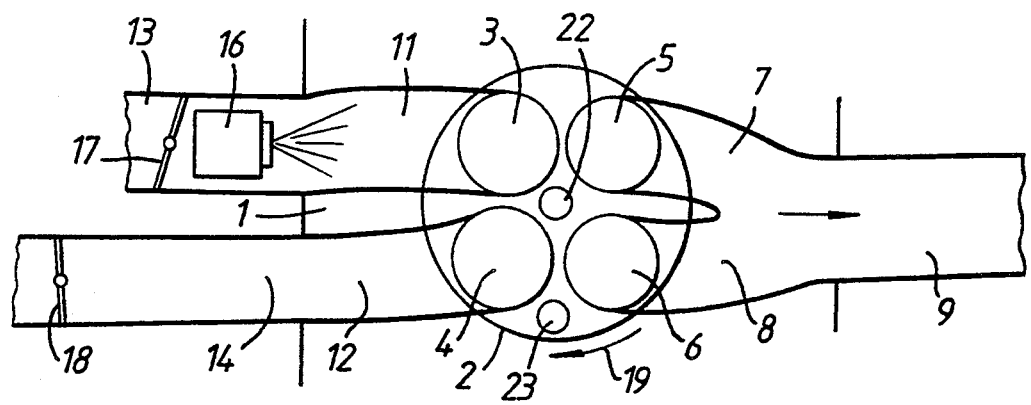
FIG. 6 shows a plan view, with part in section, of a fourth embodiment of the engine.
Figure 7:
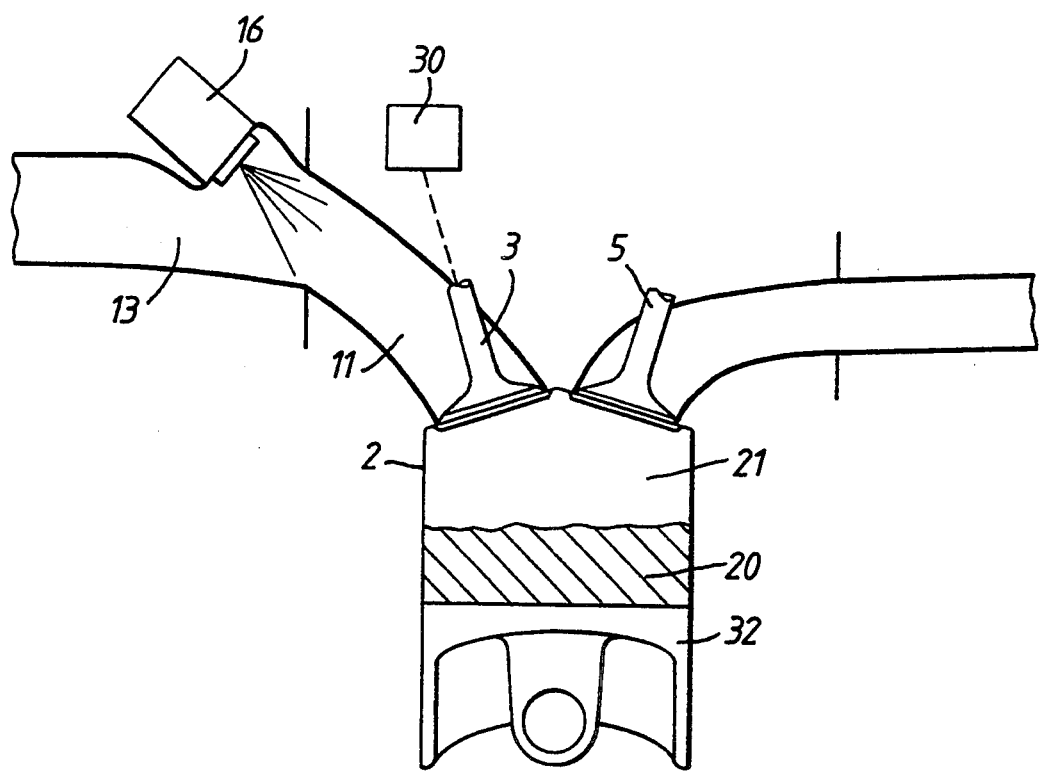
FIG. 7 shows a side view, with part in section, of the fourth embodiment of the invention.

FIGS. 6 and 7 show a single cylinder of an engine generally similar to that of FIG. 3 but in this case no EGR duct is provided. Further, inlet valve 3 is actuated by a VVT mechanism, indicated schematically at 30, e.g. of the type disclosed in European Patent Application 0495260, which permits inlet valve 3 to open before, e.g. 45° to 90° before, the end of the exhaust stroke under light load conditions, thereby resulting in exhaust gas flowing into the inlet port 11. As movement of the piston continues, the exhaust valves close and when the intake stroke starts, the inlet valve 3 remains open thereby permitting the exhaust gas in the inlet port 11 to flow into the cylinder. Fuel injection then commences and a fuel/air mixture flows into the cylinder substantially with a swirling motion indicated by arrow 19. A stratification of the charge is produced in the cylinder such that region 20. (indicated by cross hatching) contains substantially pure EGR and the remainder of the cylinder contains substantially stoichiometric fuel and air mixture. The mixture is ignited by plug 22 or 23 or both depending on the combustion characteristics required.

FIGS. 8A and 8B illustrate the valve opening and closing times, expressed in terms of the angular position of the crank shaft of the engine of FIGS. 6 and 7, with and without EGR, i.e. under low and high load conditions, from which it can be seen that with EGR, one inlet valve opens at the usual time while the other one, namely valve 3, opens earlier than usual, i.e. substantially before the end of the exhaust stroke. In FIG. 8B, TDC and BDC represent the top dead-center and bottom dead center positions, respectively, of the piston. The points IVO(3) and IVO(4) indicate the times at which the inlet valves 3 and 4 open, respectively.

It will be appreciated that numerous modifications may be effected to the embodiments described above. Thus, an additional inlet port may be provided in each case to provide a total of two or three inlet ports. This further port would normally be closed by means of a throttle valve or the associated valve deactivated under low load conditions and air would thus normally flow through it only under high load conditions. Alternatively, those embodiments with two inlet ports may be modified by providing a third inlet port between the two illustrated inlet ports, the fuel injector being provided in the third inlet port. The operation of this embodiment will be substantially the same as before but the stratification can be arranged to produce a zone of fuel air mixture between two zones of recirculated exhaust gas. Furthermore, instead of preventing air flowing through an inlet port under low load conditions by means of a throttle valve, e.g. valve 18 in FIG. 4, the same effect may be achieved by deactivating the associated inlet valve.

Obviously, numerous modifications and variations of the present invention are possible in the light of the above teachings. It is therefore to be understood that within the scope of the appended claims, the invention may be practiced otherwise than as specifically described herein.

We claim:

1. In a spark ignited engine employing exhaust gas recirculation and stratification of the recirculated exhaust gas, and having at least one cylinder accommodating a piston, at least one inlet port cooperating with an inlet valve for introducing air into said cylinder, a fuel supply for introducing fuel into said cylinder, and at least one exhaust port cooperating with an exhaust valve for discharging exhaust gas from said cylinder, wherein the improvement comprises:
   an exhaust gas recirculation duct connecting said exhaust port to the first inlet port;
   a diverter valve located at the juncture of said exhaust gas recirculation duct and said first inlet port, and being operable, at low engine loads, to connect said first inlet port to said exhaust gas recirculation duct for introducing solely recirculated exhaust gas through said first inlet port into said cylinder and, at high engine loads, to connect said first inlet port to the atmosphere for introducing air into said cylinder;
   a second inlet port cooperating with a second inlet valve communicating with said cylinder;
   said fuel supply being operative to permit the fuel to be introduced into said second inlet port; and
   said first and second inlet ports being of the tumbling type whereby gas flowing in through said inlet ports swirls within a respective portion of said cylinder about an axis substantially perpendicular to the axis of said cylinder.

2. The engine as claimed in claim 1, further comprising:
   valve means operatively associated with said second inlet port to permit a progressively increasing volume of air to flow through said second inlet port as the engine load increases.

3. In a spark ignited engine employing exhaust gas recirculation and stratification of the recirculated exhaust gas, and having at least one cylinder accommodating a piston, at least one inlet port cooperating with an inlet valve for introducing air into said cylinder, a fuel supply for introducing fuel into said cylinder, and at least one exhaust port cooperating with an exhaust valve for discharging exhaust gas from said cylinder, wherein the improvement comprises:
   an exhaust gas recirculation duct connecting said exhaust port to the first inlet port;
   first valve means located at the juncture of said exhaust gas recirculation duct and said first inlet port, and having a first valve state and a second valve state;
   said valve means being operable in its first valve state, at low engine loads, to introduce solely recirculated exhaust gas through said first inlet port into said cylinder during an induction stroke of said piston, and being operable in its second valve state, at high engine loads, to introduce air through said first inlet port into said cylinder during an induction stroke of said piston;
   the introduction of air through said first inlet port occurring at a time which does not overlap with that during which exhaust gas is recirculated therethrough;
   a second inlet port cooperating with a second inlet valve communicating with said cylinder;

second valve means operatively associated with said second inlet port for controlling the introduction of air into said cylinder through said second inlet port during an induction stroke of said piston; and said fuel supply being operative to permit fuel to be introduced into said second inlet port.

4. The engine as claimed in claim 3, wherein:

said second valve means is operative to permit the introduction of air into said cylinder at low engine loads concurrently with the introduction of recirculated exhaust gas through said first inlet port.

5. The engine as claimed in claim 3, wherein:

said second valve means is operative to permit a progressively increasing volume of air to flow through said second inlet port as the engine load increases.

6. The engine as claimed in claim 3, further comprising:

additional valve means in said first inlet port which is operative to permit a progressively increasing volume of air to flow through said first inlet port, as the engine load increases, when said first valve means is in its second valve state.

7. The engine as claimed in claim 3, wherein:

said first inlet port and said second inlet port are of the tumbling type whereby gas flowing in through said inlet ports swirls within respective portions of said cylinder about an axis substantially perpendicular to the axis of said cylinder.

8. A method of employing exhaust gas recirculation and stratification of the recirculated exhaust gas in a spark ignited engine having at least one cylinder accommodating a piston, a first inlet port cooperating with a first inlet valve for introducing air into said cylinder, a second inlet port cooperating with a second inlet valve communicating with said cylinder, the first and second inlet ports being of the tumbling type whereby gas flowing in through said inlet ports swirls within a respective portion of said cylinder about an axis substantially perpendicular to the axis of said cylinder, a fuel supply for introducing fuel into said cylinder, and at least one exhaust port cooperating with an exhaust valve for discharging exhaust gas from said cylinder, comprising the steps of:

introducing solely recirculated exhaust gas into said cylinder through said first inlet port during an induction stroke of said piston, at low engine load;

introducing air into said cylinder through said first inlet port during an induction stroke of said piston, at high engine load; and introducing air into said cylinder through said second inlet port during an induction stroke of said piston.

9. The method of claim 8, wherein:

the air is introduced into said cylinder through said second inlet port concurrently with the introduction of recirculated exhaust gas into said first inlet port.

10. The method of claim 8, further comprising the step of:

progressively increasing the volume of the air introduced through said first inlet port into said cylinder as the engine load increases.

11. The method of claim 8, further comprising the step of:

progressively increasing the volume of the air introduced through said second inlet port into said cylinder as the engine load increases.

12. The method of claim 8, wherein:

the fuel is introduced into said cylinder through said second inlet port.

* * * * *